US006338651B1

(12) United States Patent
Svette, Jr. et al.

(10) Patent No.: US 6,338,651 B1
(45) Date of Patent: Jan. 15, 2002

(54) ELECTRICAL CONNECTOR ASSEMBLY WITH SEAL

(75) Inventors: Joseph Albert Svette, Jr., Newton Falls; George Raymond Herlinger, Niles, both of OH (US); Gregory S. Reese, Sterling Hts, MI (US); John H. Bakker, Cortland; Michael M Ruberto, Austintown, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/636,403

(22) Filed: Aug. 10, 2000

(51) Int. Cl.[7] .......................... H01R 13/73; H02B 1/01
(52) U.S. Cl. ....................................... 439/559; 439/560
(58) Field of Search ................................ 439/559, 277, 439/281, 589, 560, 587, 556, 588, 247, 248

(56) References Cited

U.S. PATENT DOCUMENTS 4,684,190 A * 8/1987 Clark et al. ................ 439/587
5,895,290 A * 4/1999 Self, Jr. ...................... 439/556
6,033,247 A * 3/2000 Gregory, II ................ 439/248

* cited by examiner

*Primary Examiner*—Brian Sircus
*Assistant Examiner*—Chandrika Prasad
(74) *Attorney, Agent, or Firm*—Thomas A. Twomey

(57) ABSTRACT

An electrical connector assembly supports a number of terminals as they extend through a wall such as one might find in a headlamp housing to mate with mating terminals outside the housing. The electrical connector assembly includes an elongated conduit or housing for supporting the terminals as they extend through the wall, where the conduit has a flange extending radially outwardly from one end of the conduit. The connector assembly also includes a seal having a jacket portion extending around the conduit adjacent the flange, and a skirt portion extending radially outwardly from the conduit and over the flange to effect a seal between the electrical connector assembly and the wall.

7 Claims, 3 Drawing Sheets

ELECTRICAL CONNECTOR ASSEMBLY WITH SEAL

TECHNICAL FIELD

The subject invention relates to electrical connector assemblies, and more particularly to electrical connector assemblies having a seal for sealing between the electrical connector assembly and a support structure such as a wall.

BACKGROUND OF THE INVENTION

Persons of skill in the connector art are familiar with male connectors that extend through a wall or similar support structure to connect with a female connector. In certain applications it is necessary to provide a water-tight seal between the male connector and the wall. This is true in the art of vehicle headlamps, where power for the headlamp comes into the headlamp housing by means of a male connector that extends through a wall in the housing. Because water impacts the headlamp housing, and because engineers do not want water penetrating into the housing, it is important to create a reliable seal between the male connector and the housing. Until recently, a simple compression gasket was used to seal between the male connector and the housing. The compression gasket arrangement is shown in FIG. 1.

The compression gasket has to be compressed during installation, and this requires the use of a special press. Also, the gasket design is not as robust as it could be. This leaves room for improvement in the design of the gasket.

SUMMARY OF THE INVENTION AND ADVANTAGES

An electrical connector assembly is disclosed for supporting at least one terminal as it extends through a wall and mates with a mating terminal. The electrical connector assembly includes an elongated conduit for supporting the terminal as the terminal extends through the wall, where the conduit has a flange extending radially outwardly from one end of the conduit. The connector assembly also includes a seal having a jacket portion extending around the conduit adjacent the flange, and a skirt portion extending radially outwardly from the conduit and over the flange to effect a seal between the electrical connector assembly and the wall.

This electrical connector assembly can be assembled to a wall by hand because the seal does not need to be compressed with any substantial force. This eliminates the need for any press and pressing operation. Also, the seal has a robust design that provides redundant sealing features that seal over a wide range of fits between the conduit and the wall.

FIGURES IN THE DRAWINGS

The present invention will now be described, by way of example, with reference to the accompanying drawings, in which.

DESCRIPTION OF THE PREFERRED EMBODIMENT

Figure 2:
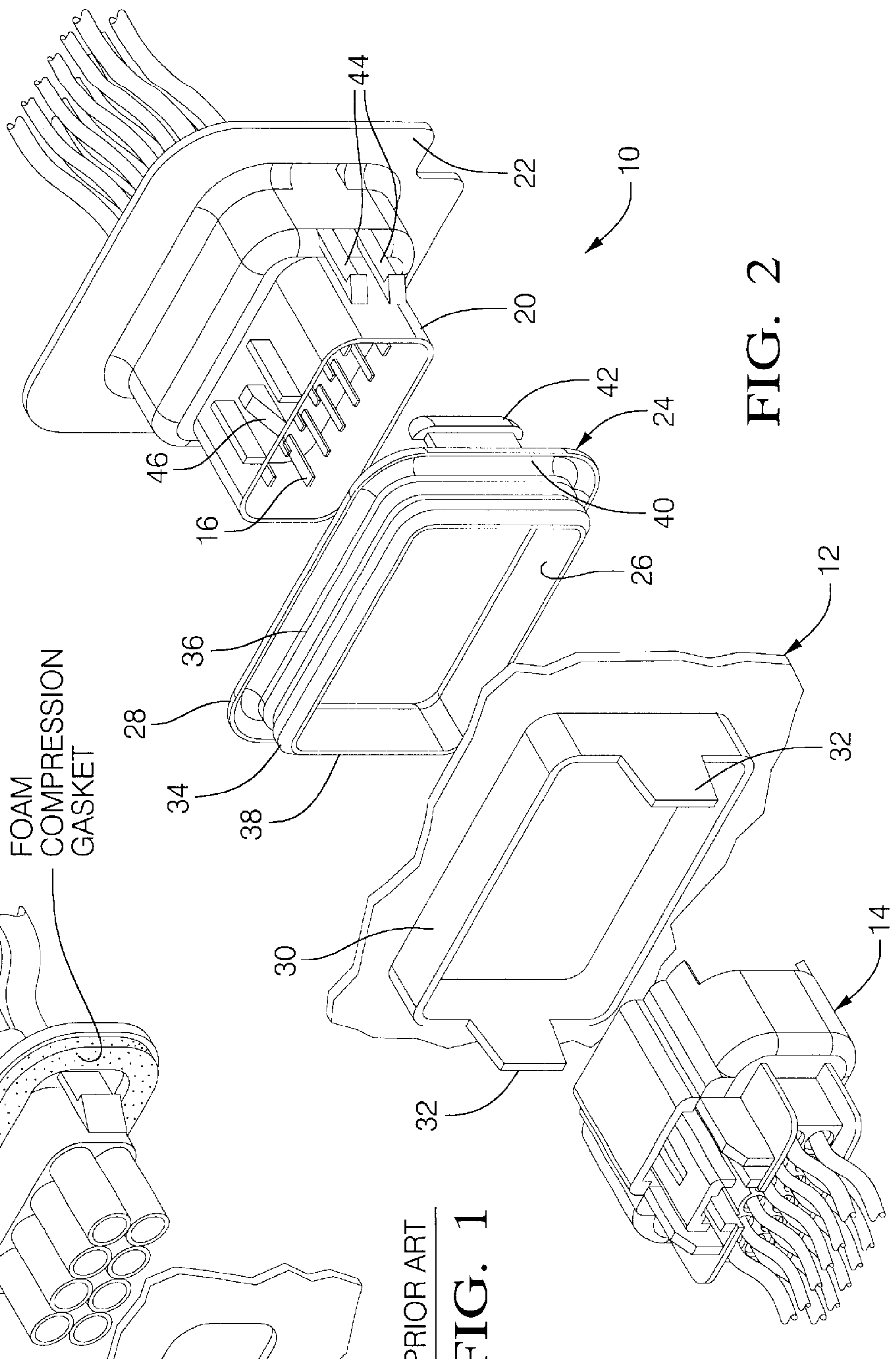
FIG. 2 is an exploded perspective view of the subject connector assembly together with a wall and a mating connector assembly.
Figure 1:
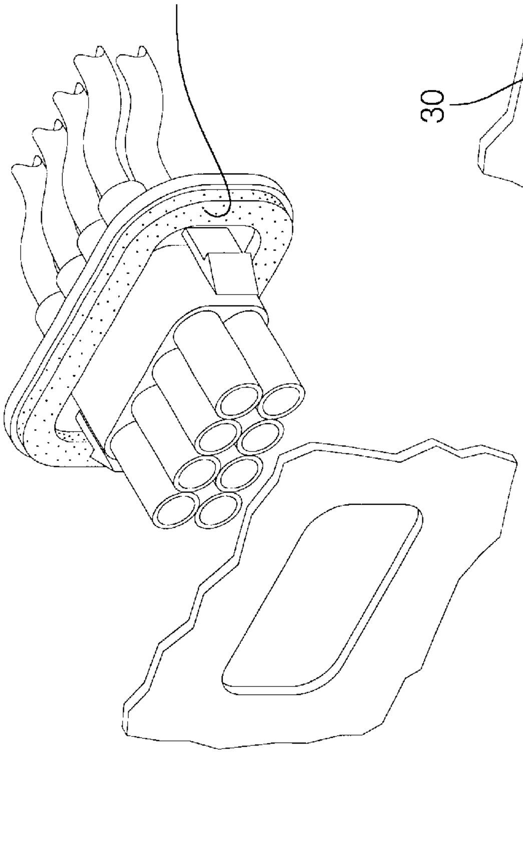
PRIOR ART FIG. 1
FIG. 1 is an exploded perspective view of a prior art connector having a foam compression gasket serving as a seal.

Referring to the Figures wherein like numerals indicate like or corresponding parts throughout the several views, an electrical male connector assembly of the present invention is generally shown at 10. The connector assembly 10 is adapted to extend through a wall generally indicated at 12 to connect with a mating or female connector assembly generally indicated at 14. The connector assembly 10 supports at least one terminal 16 as the terminal extends through the wall 12 and mates with a mating terminal 18 in the female connector assembly 14. The assembly 10 includes an elongated conduit or housing or body 20 for supporting the terminal 16 as the terminal extends through the wall 12. The conduit 20 is rigid and has a rigid flange or base 22 extending radially outwardly from one end of the conduit. The conduit 20 and flange 22 are preferably molded as a unit from a suitable plastic material. The assembly 10 also includes a seal disposed on the conduit 20, where the seal is generally indicated at 24. The seal 24 has a jacket portion 26 extending around the conduit 20 adjacent the flange 22, and an integral skirt portion 28 extending radially outwardly from the conduit 20 and over the flange 22 to effect a seal between the electrical male connector assembly 10 and the wall 12.

According to a preferred embodiment of t he invention, the electrical male connector assembly 10 is for a headlamp. The assembly 10 extends through the wall 12 of the headlamp housing to connect with the female connector assembly 14 outside the housing. The version of the assembly 10 shown in the Figures supports twelve terminals as they extend through the headlamp housing wall 12 to mate with mating terminals 18 in the female connector assembly 14.

Figure 3:
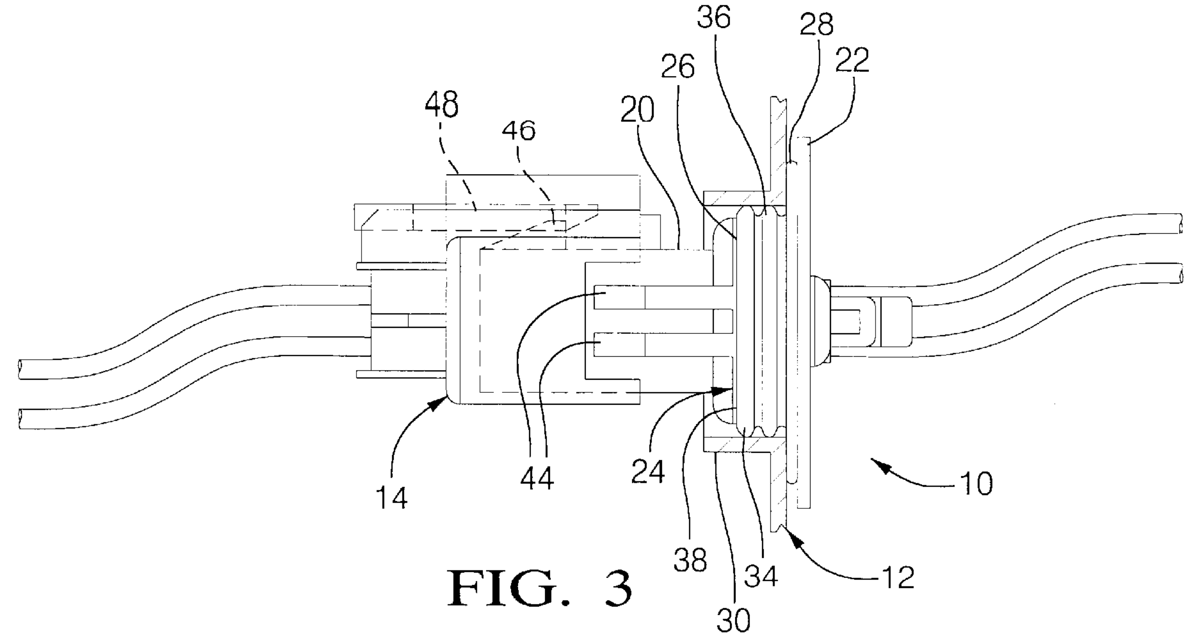
FIG. 3 is a side view of the connector assembly assembled to the wall with the wall partly cut away.

As shown in FIGS. 2 and 3, the wall 12 defines an opening for receiving the male connector assembly 10. The wall 12 includes a shroud 30 disposed around the opening. The shroud 30 includes oppositely disposed tips 32.

The details of the seal 24 are show n in FIGS. 2 and 3. The jacket portion 26 of the seal 24 includes a first flexible rib 34 extending radially outwardly to engage the shroud 30 of the wall 12 forming a seal between the wall and electrical male connector assembly 10. The jacket portion 26 also includes a second flexible rib 36 disposed between the first flexible rib 34 and the skirt portion 28 and extending radially outwardly to engage the wall 12 and form another, redundant seal between the wall 12 and electrical male connector assembly 10. This double rib design provides two levels or lines of sealing. The jacket portion 26 of the seal includes an insertion end 38 disposed on the side of the first rib 34 opposite the second rib 36, the insertion end tapering radially inwardly. The insertion end 38 facilitates insertion of the male connector assembly 10 into the shroud 30 of the wall 12.

The skirt portion 28 of the se al 24 defines a U-shaped channel 40 extending around the jacket portion 26. The purpose of this channel 40 is to allow the skirt 28 to blossom out, or deform, when compressed to provide for yet further sealing. This is shown in the cut-away view in FIG. 3. The overall effect of the channel 40 is to provide another line of sealing—in addition to that provided by the ribs 34, 36—between the flange 22 of the conduit 20 of the connector assembly 10 and the wall 12.

The seal 24 is made from a silicone material. This allows the seal 24 to compress with minimal force and yet still provide for adequate sealing.

The seal 24 includes at least two retaining tabs 42 engaging either the conduit 20 or the flange 22. These retaining tabs 42 attach the seal to the male connector assembly 10. In the version shown, the tabs 42 extend into holes in the flange 22.

The male connector assembly 10 also includes a retainer 44 formed unitarily to the conduit 20 and adapted to retain the male connector assembly 10 to the wall 12. In the embodiment shown in FIG. 2, for example, the retainer 44 is a set of four tangs, where two of the tangs are disposed on either side of the male connector assembly 10 (only two of the tangs are visible in FIG. 2). These retainers or tangs 44 mate with the oppositely disposed tips 32 on the shroud 30 once the male connector assembly 10 is fully inserted into the opening of the wall 12. The male connector assembly 10 also includes some appropriate structure 46 for a locking connection to the female connector assembly 14. In the embodiment shown, the structure is a ramp 46 formed unitarily to conduit 20 and interconnecting with a single tang 48 on the female connector assembly 14.

Figure 4:
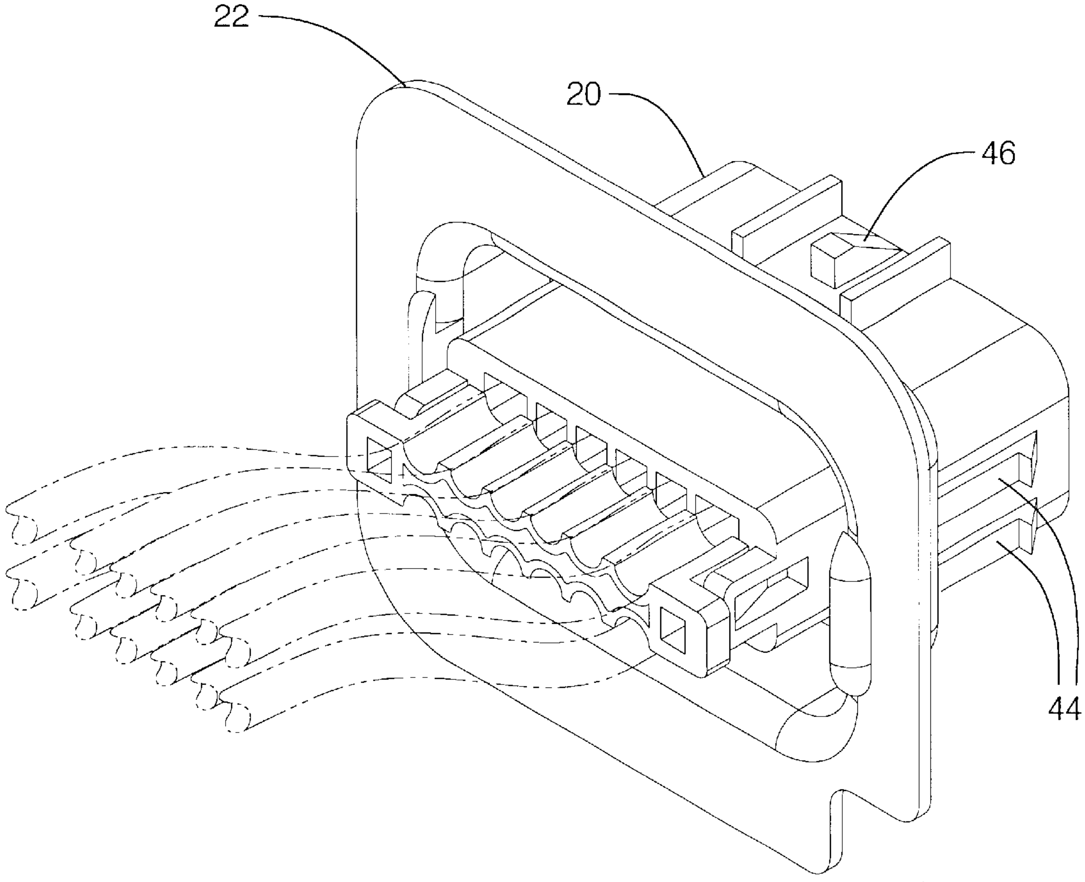
FIG. 4 is a perspective view of the rear of the connector assembly.
Figure 5A:
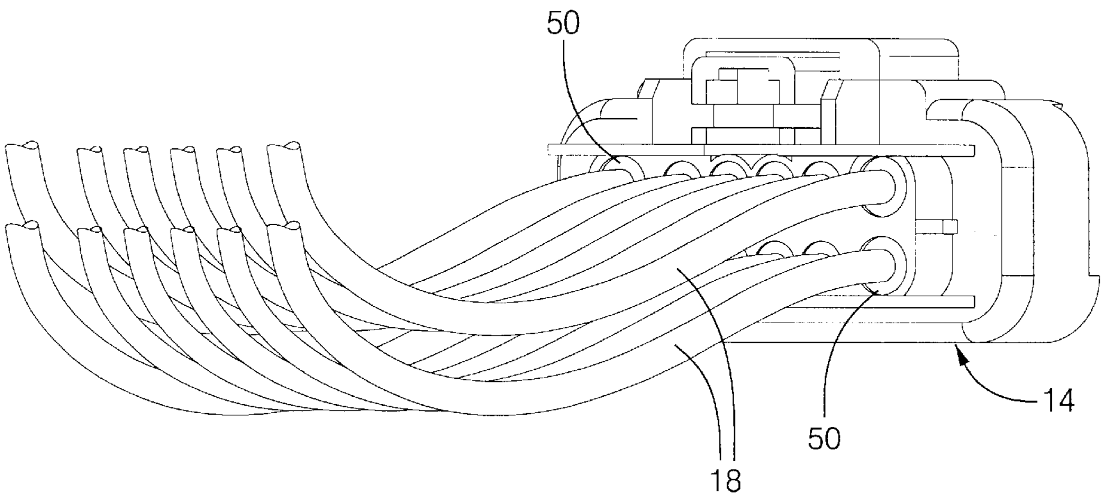
FIG. 5A is a perspective view of the rear of a mating electrical connector assembly.
Figure 5B:
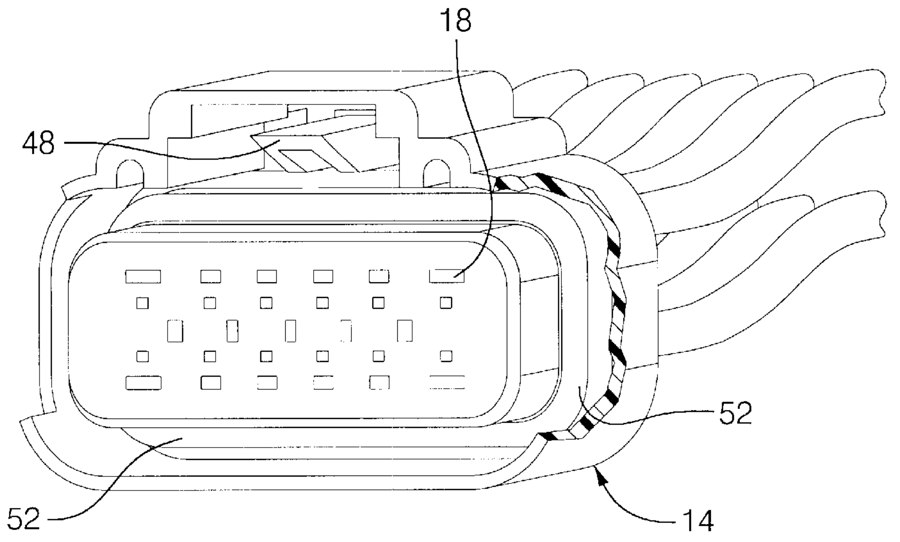
FIG. 5B is a perspective view of the front of the mating electrical connector assembly.

The mating female connector assembly 14 has a number of seals 50, 52 to seal the connection with the male connector assembly 10. FIG. 5A shows a set of terminal seals 50 that extend around each terminal 18 as it enters the female connector assembly 14 from the rear. FIG. 5B shows an end seal 52 extending inside the female connector assembly 14. The very tip of the male connector assembly 10 abuts this end seal 52 when the male connector assembly 10 is fully inserted into the female connector assembly 14. Together, the end seal 52 and the terminal seals 50 prevent water from passing into and through the male connector assembly 10. These two sets of seals 50, 52 render unnecessary any terminal seals on the male connector assembly 10, making the male connector assembly less costly to produce. FIG. 4 shows that the male connector assembly 10 is configured for unsealed terminals.

In operation, the seal 24 is disposed over the male connector assembly 10, with the tabs 42 extending into the holes in the flange 22 to secure the seal to the male connector assembly 10. Then the male connector assembly 10 may be inserted into the opening in the wall 12 of the headlamp housing. When the male connector assembly 10 is fully inserted, the tangs 44 deflect outwardly to engage the tips 32 of the shroud 30. At this time, the ribs 34, 36 of the seal 24 engage the shroud 30. As shown in FIG. 3, the ribs 34, 36 are sized so that the shroud 30 compresses the ribs slightly to effect a good seal. The wall further deforms the skirt 28 of the seal 24—compressing the channel 40—also to effect good sealing. At this point, the male and female connector assemblies 10, 14 may be joined. Because of the seal 24, and the sets of seals 50, 52 in the female connector assembly 14, no water can pass through the opening in the wall 12 and into the headlamp housing.

What is claimed is:

1. An electrical connector assembly for supporting at least one terminal as it extends through a wall and mates with a mating terminal, the electrical connector assembly comprising:

an elongated conduit for supporting the terminal as the terminal extends through the wall, the conduit having a flange extending radially outwardly from one end of the conduit and the opposite end of the conduit projected through the wall;

the wall having a shroud projecting from the wall and disposed circumferentially about the conduit and axially between the flange and the opposite end of the conduit;

a seal having a jacket portion extending around the conduit adjacent the flange and disposed radially between the conduit and the shroud, and a skirt portion extending radially outwardly from the conduit and over the flange to effect a seal between the electrical connector assembly and the wall; and wherein the jacket portion of the seal includes a first flexible rib extending radially outwardly to engage the projecting shroud of the wall and form a seal between the wall and the electrical connector assembly.

2. The electrical connector assembly of claim 1 wherein the jacket portion of the seal includes a second flexible rib disposed between the first flexible rib and the skirt portion and extending radially outwardly to engage the wall and form another seal between the wall and the electrical connector assembly.

3. The electrical connector assembly of claim 1 wherein the skirt portion defines a channel extending around the jacket portion.

4. The electrical connector assembly of claim 1 wherein the jacket portion of the seal includes an insertion end disposed on the side of the first rib opposite the second rib, the insertion end tapering radially inwardly.

5. The electrical connector assembly of claim 1 wherein the seal is made from silicone.

6. The electrical connector assembly of claim 1 wherein the seal includes at least one retaining tab engaging the flange.

7. An electrical connector assembly for supporting at least one terminal as it extends through a wall and mates with a mating terminal, the electrical connector assembly comprising:

an elongated conduit for supporting the terminal as the terminal extends through the wall, the conduit having a flange extending radially outwardly from one end of the conduit and the opposite end of the conduit projected through the wall;

a seal having a jacket portion and a skirt, the jacket portion extending around the conduit adjacent the flange, the jacket portion disposed radially between the conduit and a shroud projecting from the wall, the skirt portion extending radially outwardly from the conduit and over the flange to effect a seal between the electrical connector assembly and the wall; and the jacket portion of the seal having a first flexible rib extending radially outwardly to engage the shroud of the wall thereby forming a seal between the wall and the electrical connector assembly.

* * * * *